United States Patent
Andersson et al.

(10) Patent No.: US 10,462,715 B2
(45) Date of Patent: Oct. 29, 2019

(54) CELL RE-SELECTION PROCEDURE ASSISTANCE AND DEVICES

(71) Applicant: Telefonaktiebolaget LM Ericsson (publ), Stockholm (SE)

(72) Inventors: Jonas Andersson, Helsingborg (SE); Niclas Palm, Svedala (SE); Emil Pettersson, Helsingborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 187 days.

(21) Appl. No.: 15/542,253

(22) PCT Filed: May 30, 2017

(86) PCT No.: PCT/SE2017/050574
§ 371 (c)(1),
(2) Date: Jul. 7, 2017

(87) PCT Pub. No.: WO2018/222093
PCT Pub. Date: Dec. 6, 2018

(65) Prior Publication Data
US 2018/0352485 A1    Dec. 6, 2018

(51) Int. Cl.
*H04W 36/00*    (2009.01)
*H04W 36/22*    (2009.01)
(Continued)

(52) U.S. Cl.
CPC ... *H04W 36/0061* (2013.01); *H04W 36/0083* (2013.01); *H04W 36/22* (2013.01); *H04W 36/38* (2013.01); *H04W 36/30* (2013.01)

(58) Field of Classification Search
CPC . H04W 36/00; H04W 36/0061; H04W 36/20; H04W 36/22; H04W 36/30
See application file for complete search history.

(56) References Cited

U.S. PATENT DOCUMENTS

2005/0260990 A1   11/2005   Huang et al.
2012/0202504 A1*   8/2012   Wegmann ............. H04W 16/08
                                                            455/438

(Continued)

FOREIGN PATENT DOCUMENTS

EP    2387271 A1   11/2011
EP    3051877 A1    8/2016
(Continued)

OTHER PUBLICATIONS

Unknown, Author, "3rd Generation Partnership Project; Technical Specification Group Radio Access Network; Evolved Universal Terrestrial Radio Access (E-UTRA); User Equipment (UE) procedures in idle mode (Release 14)", 3GPP TS 36.304 V14.1.0, Dec. 2016, pp. 1-46.

(Continued)

*Primary Examiner* — Chi Ho A Lee
*Assistant Examiner* — Andrew Lee
(74) *Attorney, Agent, or Firm* — Murphy, Bilak & Homiller, PLLC

(57) ABSTRACT

A method for assisting in a cell re-selection procedure in a cellular communication system comprises obtaining (S1) of information comprising radio conditions and/or user equipment population related to at least a serving cell and optionally also related to at least one neighbor cell to the serving cell. The obtained information is compared (S2) with a criterion for enforced cell re-selection procedure. If the criterion for enforced cell re-selection procedure is fulfilled by the obtained information, an enforcement of, or an action for increasing the probability for causing, a cell re-selection procedure of at least one user equipment within the serving cell is initialized (S3). Devices for performing such a method are also disclosed.

14 Claims, 15 Drawing Sheets

(51) Int. Cl.
*H04W 36/38* (2009.01)
*H04W 36/30* (2009.01)

(56) References Cited

U.S. PATENT DOCUMENTS

| | | | | |
|---|---|---|---|---|
| 2013/0053043 | A1* | 2/2013 | Wei | H04W 36/0055 455/437 |
| 2013/0188499 | A1* | 7/2013 | Mach | H04W 48/20 370/252 |
| 2013/0337814 | A1 | 12/2013 | Wong et al. | |
| 2014/0162650 | A1* | 6/2014 | Islam | H04W 36/0085 455/436 |
| 2014/0162659 | A1* | 6/2014 | Aminaka | H04W 36/14 455/437 |
| 2014/0177429 | A1* | 6/2014 | Patil | H04W 28/0289 370/216 |
| 2015/0024757 | A1* | 1/2015 | Bulakci | H04W 36/0088 455/437 |
| 2015/0319667 | A1* | 11/2015 | Dalsgaard | H04W 24/10 455/444 |
| 2015/0358865 | A1* | 12/2015 | Fu | H04W 36/0055 455/436 |
| 2016/0381630 | A1* | 12/2016 | Krishnamoorthy | H04W 76/14 370/329 |
| 2017/0164265 | A1* | 6/2017 | Dai | H04W 40/36 |
| 2017/0332283 | A1* | 11/2017 | Kubota | H04W 36/0016 |

FOREIGN PATENT DOCUMENTS

| | | |
|---|---|---|
| WO | 2009117667 A1 | 9/2009 |
| WO | 2011138346 A1 | 11/2011 |
| WO | 2013115696 A1 | 8/2013 |
| WO | 2014160106 A1 | 10/2014 |
| WO | 2017053286 A1 | 3/2017 |

OTHER PUBLICATIONS

Unknown, Author, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.1.0, Dec. 2016, pp. 1-654.

* cited by examiner

CELL RE-SELECTION PROCEDURE ASSISTANCE AND DEVICES

TECHNICAL FIELD

The proposed technology generally relates to cell selection in a cellular communication system, and in particular to methods for assisting in cell re-selection procedures and nodes therefore.

BACKGROUND

In a cellular communication system, a User Equipment (UE) may camp in a cell in a so-called idle-mode. The UE is associated with the cell, but has no permanent active links established with the radio node of the cell. The UE may thereby save energy buy refraining from frequent communication with the radio node. However, even when camping on a serving cell in idle-mode, an UE must regularly search for a better serving cell. This inevitably involves powering up of circuitry and controllers.

In the current Narrow Band Internet of Things (NB-IoT) solution, no measurement reporting by the UEs nor any handover procedure is defined to support connected mode mobility for UEs between cells. This is due to requirements to keep both the cost of and energy consumption by the UEs at a very low level. The ability of supporting measurement reporting and handover should increase both cost and energy consumption.

When a stationary UE first performs a cell selection, it will select the first suitable cell fulfilling the cell selection criterion in order to keep the initial cell selection delay at minimum. If this serving cell still fulfils the cell selection criterion at the next measurements occasion, the UE may choose not to perform further cell reselection measurements. This means that a stationary UE can camp in a suitable cell that is not necessarily the best available cell for a substantial time.

The re-selection procedure involves scanning and measurement on several frequencies and cells. It is therefore desirable that this procedure is rarely triggered in order to preserve the battery lifetime of UE. Therefore, the system information from serving cell controlling when to do measurements and cell re-selection is intentionally configured to seldom trigger.

On the other hand, to optimize resource usage in the radio network, UEs camping on a cell in a radio condition which require high number of repetitions, i.e. NB-IoT UEs connecting to the cell at a high Coverage Enhancement (CE) level, should be kept to a minimum. It is therefore from a network perspective desirable for such UEs to find a better cell and re-select accordingly, hence the system information should be configured to frequently trigger.

The configuration of the system information is hence conflicting objectives for the network and the UE. Setting the thresholds too low will result in that few, or no, UEs will ever make measurements for cell re-selection and misses opportunities of camping on cells with better receiver levels. Setting the thresholds too high will result in high number of repetitive measurements and attempts for cell re-selection which drains UE battery.

SUMMARY

It is an object to provide methods and arrangements enabling flexible and adaptive initiation of re-selection procedures.

This and other objects are met by embodiments of the proposed technology.

According to a first aspect, there is provided a method for assisting in a cell re-selection procedure in a cellular communication system. The method comprises obtaining of information comprising radio conditions and/or user equipment population related to at least a serving cell and optionally also related to at least one neighbour cell to the serving cell. The obtained information is compared with a criterion for enforced cell re-selection procedure. If the criterion for enforced cell re-selection procedure is fulfilled by the obtained information, an enforcement of, or an action for increasing the probability for causing, a cell re-selection procedure of at least one user equipment within the serving cell is initialized.

According to a second aspect, there is provided a method for a cell re-selection procedure in a cellular communication system. The method comprises receiving, in a user equipment, of a request for performing a cell re-selection procedure. A frequency measurement for cell re-selection is performed in the user equipment as a response to the received request.

According to a third aspect, there is provided a network node configured to assist in a cell re-selection procedure in a cellular communication system. The network node is configured to obtain information comprising radio conditions and/or user equipment population related to at least a serving cell and optionally also related to at least one neighbour cell to the serving cell. The network node is configured to compare the obtained information with a criterion for enforced cell re-selection procedure. The network node is configured to initialize, if the criterion for enforced cell re-selection procedure is fulfilled by the obtained information, an enforcement of, or an action for increasing the probability for causing, a cell re-selection procedure of at least one user equipment within the serving cell.

According to a fourth aspect, there is provided a user equipment in a cellular communication system, wherein the user equipment is configured to receive a request for performing a cell re-selection procedure. The user equipment is configured to perform a frequency measurement for cell re-selection as a response to the received request.

According to a fifth aspect, there is provided a computer program comprising instructions, which when executed by at least one processor, cause the processor(s) to obtain information comprising radio conditions and/or user equipment population related to at least a serving cell and optionally also related to at least one neighbour cell to the serving cell. The instructions, when executed by the processor(s), further cause the processor(s) to compare the obtained information with a criterion for enforced cell re-selection procedure. The instructions, when executed by the processor(s), further cause the processor(s) to initialize an enforcement of, or an action for increasing the probability for causing, a cell re-selection procedure of at least one user equipment within the serving cell, if the criterion for enforced cell re-selection procedure is fulfilled by the obtained information.

According to a sixth aspect, there is provided a computer program comprising instructions, which when executed by at least one processor, cause the processor(s) to receive a request for performing a cell re-selection procedure. The instructions, when executed by the processor(s), further cause the processor(s) to perform a frequency measurement for cell re-selection as a response to the received request.

According to a seventh aspect, there is provided a computer-program product comprising a computer-readable medium having stored thereon a computer program according to the fifth or sixth aspect.

According to an eighth aspect, there is provided a carrier comprising the computer program according to the fifth or sixth aspect, wherein the carrier is one of an electronic signal, an optical signal, an electromagnetic signal, a magnetic signal, an electric signal, a radio signal, a microwave signal, or a computer-readable storage medium.

According to a ninth aspect, there is provided a network node for assisting in a cell re-selection procedure in a cellular communication system. The network node comprises an information module for obtaining information comprising radio conditions and/or user equipment population related to at least a serving cell and optionally also related to at least one neighbour cell of the serving cell. The network node further comprises a comparator for comparing the obtained information with a criterion for enforced cell re-selection procedure. The network node further comprises an initializer for initializing an enforcement of, or an action for increasing the probability for causing, a cell re-selection procedure of at least one user equipment within the serving cell, if the criterion for enforced cell re-selection procedure is fulfilled by the obtained information.

According to a tenth aspect, there is provided a user equipment for use in a cellular communication system. The user equipment comprises a receiver for receiving a request for performing a cell re-selection procedure. The user equipment further comprises a re-selection module for performing a frequency measurement for cell re-selection as a response to the received request.

An advantage of the proposed technology is the possibility to, with adjustable periodicity, request UEs in suitable but still not optimal radio conditions to search for better cells. This will preserve energy in the UEs and ensure a high NB-IoT capacity in the serving cell.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of the basic functions of selection and re-selection.

The third generation partnership project (3GPP) is currently working on standardization of the Evolved Universal Terrestrial Radio Access System (E-UTRAN) radio access system, also called LTE (Long Term Evolution), and also the evolution of this system into the 5th generation radio access system, also called New Radio (NR). In the following the solution is exemplified in LTE, but is also valid in other systems, e.g. NR.

Figure 1:
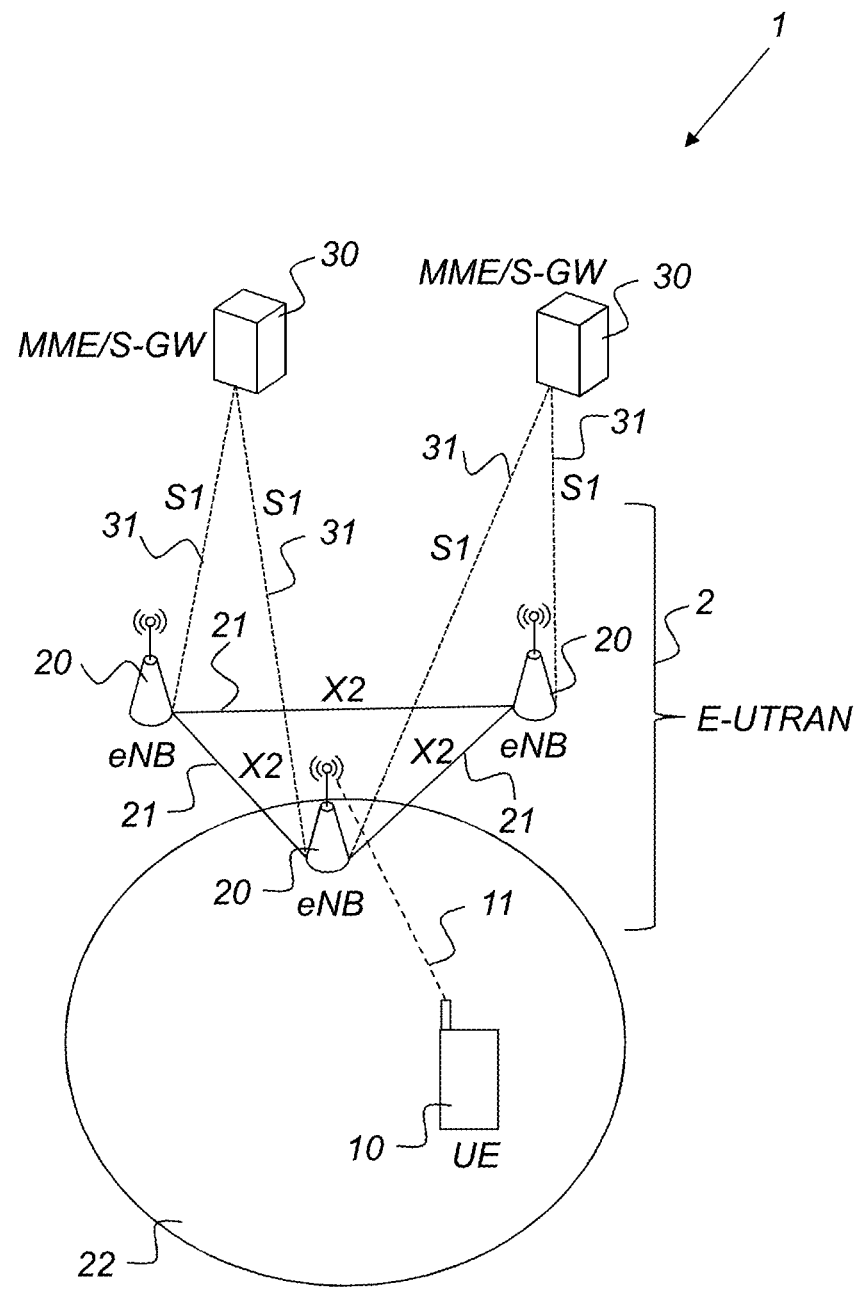
FIG. 1 is a schematic illustration of an architecture of an EPS system.

LTE is part of the Evolved Packet System (EPS), also constituting the Evolved Packet Core (EPC). The architecture of the EPS system is shown schematically in FIG. 1. A cellular communication system 1, comprises radio access nodes 23 (eNBs) and EPS nodes 30 (MME/S-GW). The eNBs 23 are parts of the E-UTRAN 2. The interface 21 between eNBs 23 is referred to as X2, and the interface 31 between eNB 23 and MME/S-GW 30 is denoted S1. The signalling transport over X2 and S1 are implemented via SCTP (Stream Control Transmission Protocol). UEs 10 may be connected via radio links 11 to one of the radio access nodes 23 i.e. to a serving cell 22. The eNBs 23 and EPS nodes 23 are examples of network nodes 20.

Figure 2:
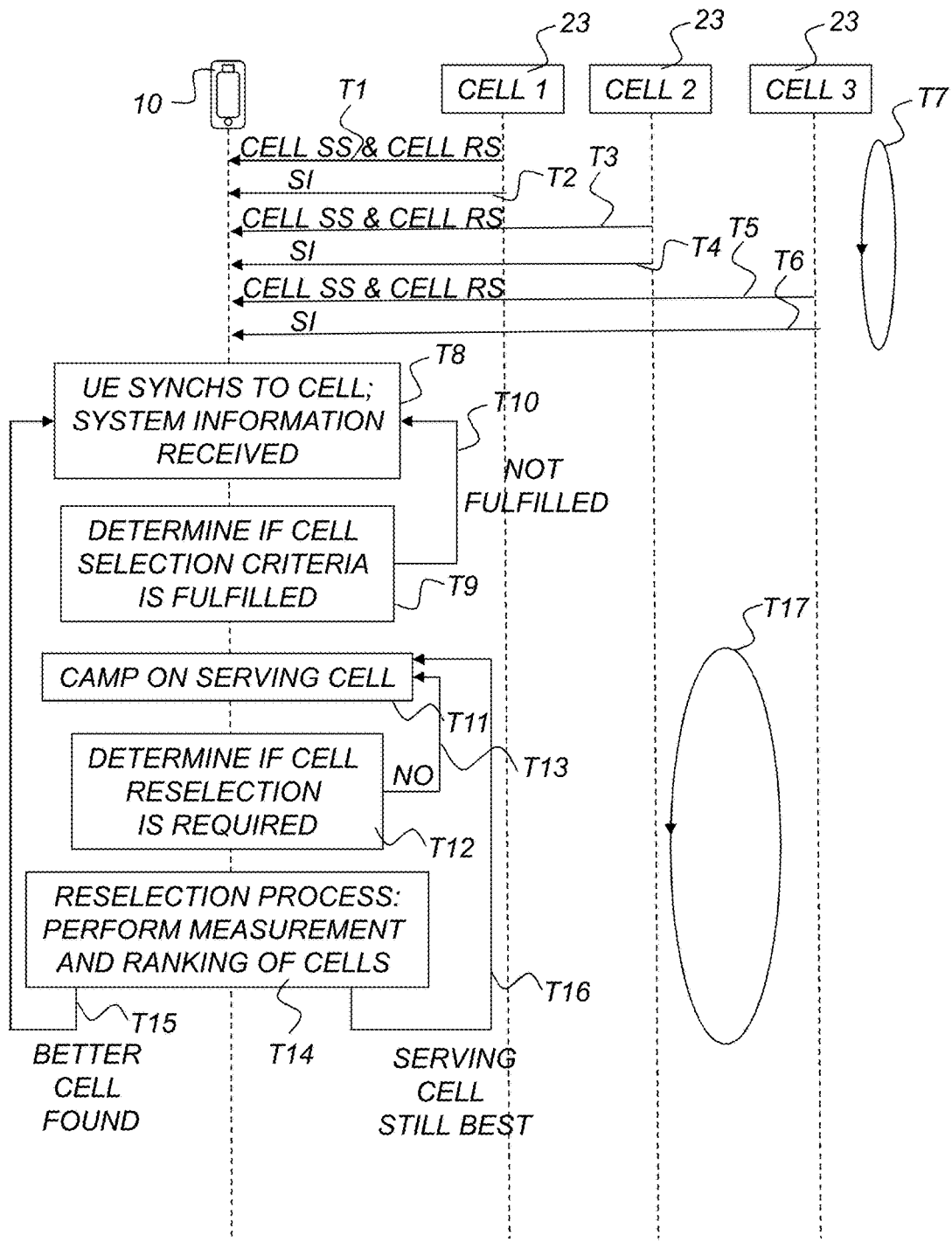
FIG. 2 is a schematic illustration of cell selection and re-selection procedures in a UE according to known procedures.

A UE in idle mode is associated with a particular serving cell. FIG. 2 schematically illustrates a cell selection and re-selection procedure in a UE 10. Nodes 23 of different cells—cell 1, cell 2, cell 3—arrange for broadcast synchronization signals SS and reference signals RS from the respective cells, as illustrated by the arrows T1, T3 and T5.

The nodes 23 also broadcast system information SI, as illustrated by the arrows T2, T4, and T6. These operations are repeated at regular periodicity as indicated by T7.

The UE 10 finds a cell and at T8, the UE 10 synchronizes to the cell and acquires system information to determine the received quality of reference signal. At T9, the UE determines whether or not the cell selection criterion is fulfilled, based on system information. If the criterion is not fulfilled, the UE returns, indicated by T10, to try to connect to another cell. If the criterion is met, the UE is at least temporarily satisfied and camps now on the selected serving cell in idle mode, as in T11.

At T12, the UE determines if measurements for cell re-selection is required. This is based on system information from the serving cell. If measurements are not required, the UE returns to the idle mode as illustrated by T13. If a re-selection is required, the UE goes to T14, where a re-selection process starts. Measurements of reference signal quality of all surrounding cells are performed and all cells that fulfils the selection criterion are ranked. If the present serving cell still is the best one, the UE returns to the idle mode, as illustrated by T16. If a better cell is found, the UE returns, as illustrated by T15, to connect to this better cell.

The re-selection monitoring and performing steps are repeated, as illustrated by T17, at regular periodicity, upon update of system information and/or if the UE leaves the connected state.

Figure 3:
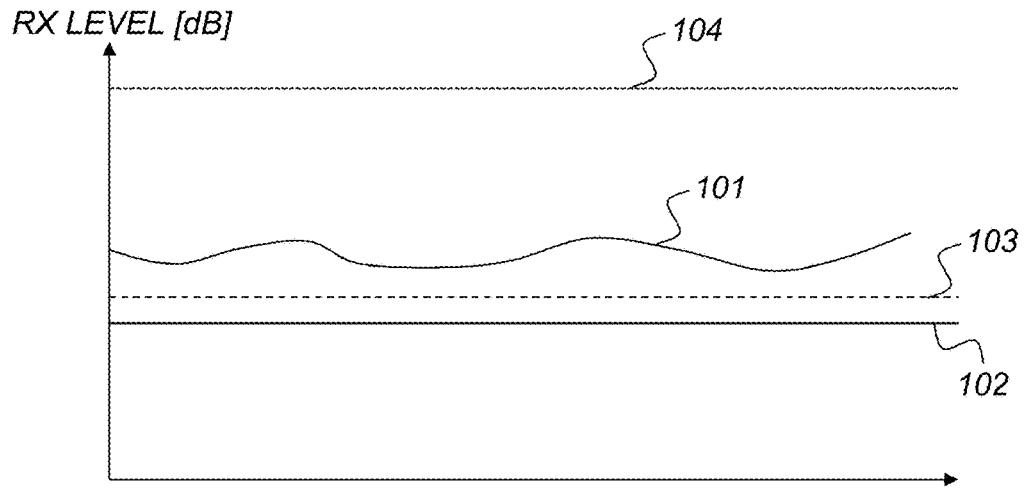
FIG. 3 is a diagram illustrating relations between thresholds and a measured RX level.

The criterion for re-selection is typically based on different thresholds of the received level (RX level) of radio signal power. The criterion for selection is typically based on both a RX level value and a quality value. FIG. 3 illustrates schematically such relations in a diagram. The curve 101 illustrates the variation of the RX level as a function of time. A threshold 102 sets the minimum of the RX level required for a cell to be selected as a serving cell. A second threshold 103 is used as criterion for if measurements of a cell re-selection process is to be performed. In the illustrated example, the measured RX level is always higher than this cell re-selection threshold 103 and it is thus concluded by the UE that measurements for cell re-selection is not required.

If the cell re-selection threshold instead is set to be higher, e.g. as illustrated by the line 104, the situation becomes different. The measure RX level 101 is then lower than the cell re-selection threshold 104 all the time and measurements for cell re-selection procedures is considered to be required.

In the current 3GPP standards, the thresholds for measurement for cell re-selection is rather static and generally address moving UEs with shifting RX levels. For IoT, it is predicted that several UEs will be of stationary nature and with radio conditions not fulfilling the cell re-selection criterion.

The technology presented herein introduces a method to trigger UEs with less than optimal radio conditions to start cell reselection measurements to find a better cell while keeping the total number of cell reselection measurements at a minimum.

The technology presented herein introduces a method to evaluate the conditions when to trigger cell reselections to stronger cells. It also introduces a method to optimize which part the UE population, e.g. characterized by their serving cell quality, that should initiate cell reselections to search for stronger cells.

Figure 4:
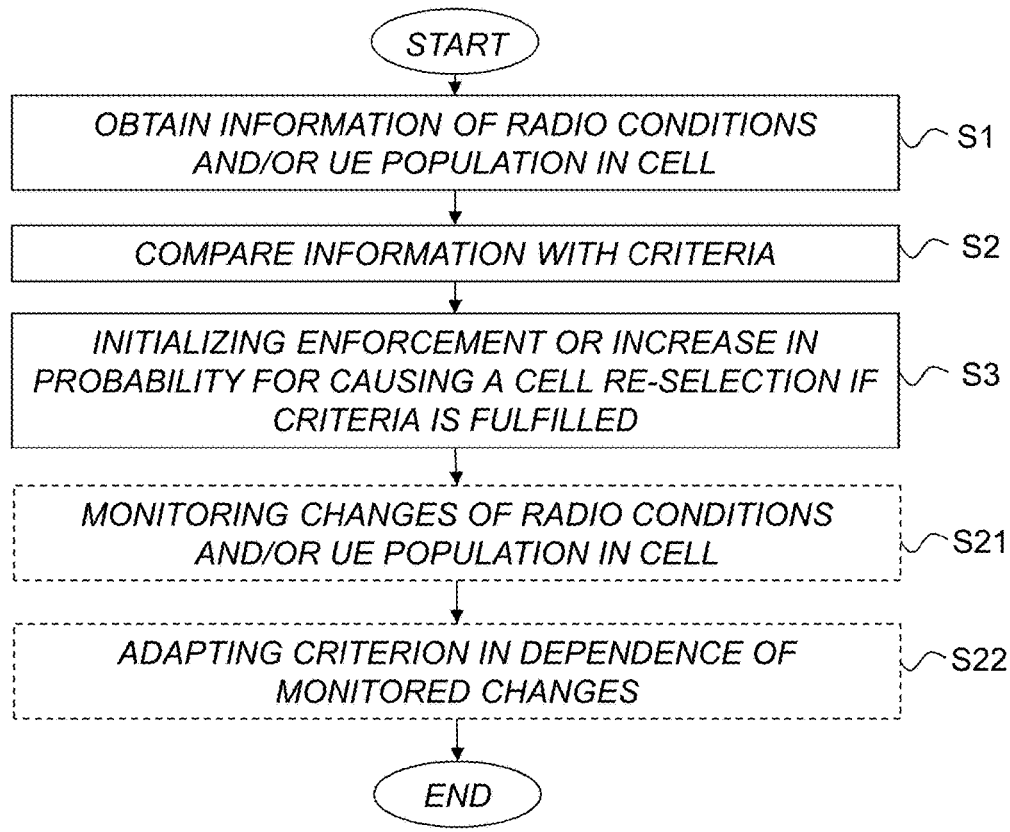
FIG. 4 is a flow diagram illustrating steps of an embodiment of a method for assisting in a cell re-selection procedure in a cellular communication system.

FIG. 4 is a schematic flow diagram illustrating steps of an embodiment of a method for assisting in a cell re-selection procedure in a cellular communication system. In step S1, information comprising radio conditions and/or user equipment population related to at least a serving cell is obtained. Optionally also radio conditions and/or user equipment population related to at least one neighbour cell to the serving cell is obtained. This obtained information is compared in step S2 with a criterion for enforced cell re-selection procedure. In step S3, if the criterion for enforced cell re-selection procedure is fulfilled by the obtained information an enforcement of, or an action for increasing the probability for causing, a cell re-selection procedure of at least one user equipment within the serving cell is initialized.

The probability that a re-selection procedure is to be initialized can thus be increased in two alternative but closely related ways. One approach is to use as much of the present communication and procedure standards as possible and adjust parameters to alter the probability for the re-selection procedure. This alternative has the advantage that the UEs do not have to be altered, and the only updating of the routines have to be performed in the network nodes.

Another flavour of the solution is to define additional signalling and/or process routines to directly enforce a cell re-selection procedure. This alternative has the advantage that it enables a more direct selection of certain individual UEs or groups of UEs if requested. However, this alternative instead requires a small adapting of the functionality in the UEs. Embodiments of both these flavours will be presented here below.

One embodiment implies that the serving cell shall change the system information specifying the thresholds for the cell reselection measurements. By defining a higher threshold, more UEs are trigged to perform cell re-selection measurements. After an "activation time", the serving cell shall revert back to the prior system information, with lower thresholds.

Figure 5:
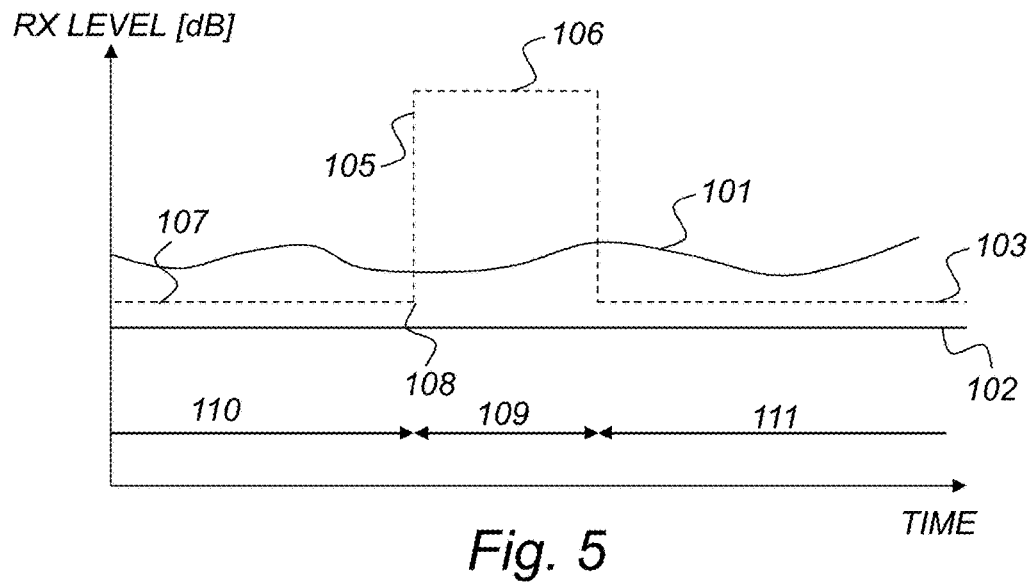
FIG. 5 illustrates relations between RX level and thresholds for cell selection and re-selection.

FIG. 5 illustrates a situation for RX level and cell selection and re-selection thresholds according to this embodiment. The measure RX level 101 behaves as usual. A cell selection threshold 102 is provided as usual. The threshold for cell re-selection 103 is however, slightly modified. In the left part of the diagram, i.e. in the beginning of the monitored times, the threshold for cell re-selection 103 is located at a relatively low level 107. During the time indicated by the arrow 110, measurements for cell re-selection are considered as not required, since the measure RX level 101 exceeds the threshold for cell re-selection 103.

The serving cell finds information indicating that the system might benefit from a check if some UEs may perform a cell re-selection. This information is discussed more in detail below. The serving cell decides at the time indicated by 108 to temporarily increase the level of the threshold for cell re-selection 103 to a high level 106. This means that during the time interval denoted by 109, the measured RX level comes below the threshold for cell re-selection 103, and the UE considers that measurements for cell re-selection is required. The temporary increase of the threshold for cell re-selection 103 ends after a certain period 109 and returns to the low level 102, used earlier in the time indicated by the arrow 111. In other words, the threshold for cell re-selection 103 presents a temporary increase 105 in level. The selection of the magnitude of the high level 106 and the duration 109 may be selected in dependence of different kinds of system information, as will be discussed further below.

In other words, the initializing of the cell re-selection procedure comprises initializing of an action for increasing the probability for causing a cell re-selection procedure of at least one user equipment within the serving cell. The action comprises increasing of a threshold for frequency measurements for cell re-selection for the user equipment(s) during a limited period of time.

Figure 6:
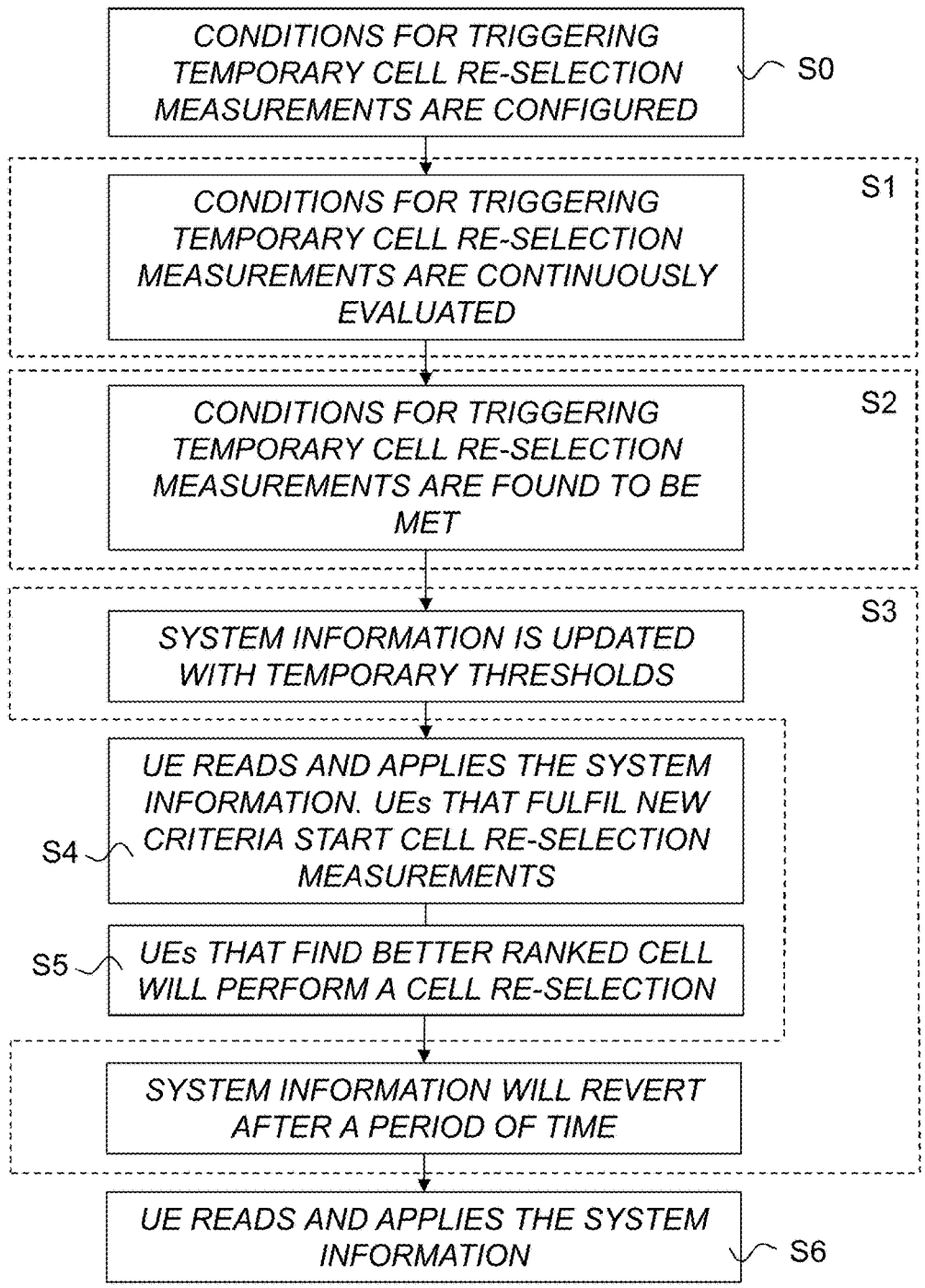
FIG. 6 illustrates different operations performed within a communication system in connection of a cell re-selection trigged by threshold changes.

FIG. 6 illustrates different operations within a communication system. This figure does not illustrate any method of any particular node, but is an illustration of the cooperation between different nodes within the system. In S0, conditions for triggering the temporary cell re-selection measurements is configured. The cell re-selection measurement is a part of a re-selection procedure. The result of such a re-selection procedure may be a switch of serving cell or not, depending on the results of the re-selection measurements. This configuration of the conditions may in different embodiments be performed e.g. by the Operation and Management (OaM) system, by a mobility management entity or by any other node being connected to these. The conditions may even be set manually by an operator.

As at least a part of step S1, c.f. FIG. 4, conditions for triggering temporary cell re-selection measurements are continuously evaluated. As will be discussed more in detail further below, the conditions may also be adapted in response to e.g. results of previous re-selection enforcements. This is in certain embodiments preferably performed in the eNB. As at least a part of step S2, c.f. FIG. 4, conditions for triggering the temporary cell re-selection measurements are met. As a part of Step S3, c.f. FIG. 4, the system information is updated with temporary thresholds. This is in certain embodiments preferably performed in the eNB. The system information is according to standard routines transferred to the UEs.

In S4, the UE has received the system information comprising e.g. the new thresholds. The UE reads the system information and applies it. There is now an increased probability that the UE might fulfil the criterion for starting a re-selection procedure. UEs that fulfil the new criterion, i.e. in the present embodiment the new threshold, start cell re-selection measurements according to standard routines. In S5, UEs that find any better ranked cell than the present serving cell will perform a full cell re-selection. If the UE instead find that the prevailing serving cell still is the best choice, the re-selection procedure is ended.

As another part of Step S3, c.f. FIG. 4, the system information is again updated with new thresholds after a period of time. Typically, this new update will revert the thresholds to the levels which were applied before the previous increase. In S6, the UE has received the system information comprising e.g. the previous thresholds. The UE reads the system information and applies it. The system has now returned to the normal idle mode status.

As can be seen from this flow, the UE operates in S4, S5 and S6 according to standard routines for cell re-selection and is therefore in this embodiment not in need of any new functionality.

The triggering criterion for when and how often to temporarily change the thresholds, the length of the "activation time", i.e. the duration of the limited period of time when the higher threshold is applied, and the level of the increased thresholds during the "activation time" may preferably be based on different information obtainable within the system, typically information comprising radio conditions and/or user equipment population related to the serving cell and/or neighbouring cells. In one embodiment, these parameters are based on an evaluation of at least one of the following:

Time since last "activation time", i.e. last initializing
Absolute level of UEs in different radio coverage conditions
Changes/Trends in absolute level of UEs in different radio coverage conditions
Ratio of UEs in different radio coverage conditions
Changes/Trends in the ratio of UEs in different radio coverage conditions
UL Interference level
Timing advance of UEs
Load level In one embodiment, the increased threshold is applied to all user equipments in the serving cell.

In another embodiment, the increased threshold is applied to a specific user equipment or a specific group of user equipments in the serving cell.

The number of UEs that selected another serving cell as an effect of this method can in one embodiment be estimated by observing the level of connected UEs over a period of time following the activation. When the observed effect of activating this method decreases over time, the time interval between activations can be increased to prevent unnecessary cell reselection measurements. This is schematically illustrated in FIG. 4 by steps S21 and S22. The dotted character of steps S21 and S22 indicates that they are preferred, but not compulsory, for achieving a basic technical effect.

In other words, in one embodiment, changes, if any, of the radio conditions and/or user equipment population of a cell are monitored in step S21 within a time range starting when the step of initializing is performed. The criterion is then adapted in step S22 in dependence of the monitored changes.

To automatically optimize the value to use for the temporary thresholds, a learning period can be used, where the level is changed in steps. Before and after each change the number of connected UEs and/or a change in the radio coverage distribution of the population are monitored. As long as there is a decrease in the number of connected UEs and/or an improvement in the radio coverage distribution of the population this is an indication of that the threshold change has led to UEs successfully reselecting other cells. When a step no longer leads to any significant decrease in the number of connected UEs and/or any improvement in the radio coverage distribution of the population the value before the last step can be considered as the optimum value to use for the thresholds for triggering cell reselection measurements. By this the learning period is over, based on evaluation of the parameters in the list above the method can decide on when/if a new learning period should be scheduled.

In a typical scenario, the probability to trigger or initializing an activation increases as the time since last activation increases. Also, if the absolute level of UE:s and/or the ratio of UE:s in poor radio conditions increases, the probability for initializing increases. Other possible conditions that may increase the probability to trigger or initializing an activation is if the changes/trends in absolute level of UE:s and/or the ratio of UE:s shows an increase of UE:s in poor radio conditions if the UL interference in neighbouring cells increases, and/or if the absolute level of UE:s and/or the ratio of UE:s with high TA increases.

Analogously, the probability to trigger or initializing an activation decreases when the above factors decreases.

The level of the elevated threshold (c.f. 106 in FIG. 5) will determine which part of the UE population that will perform cell re-selection procedure. A higher level will trigger UE:s in better radio conditions to perform cell re-selection procedure. A strategy might be to increase the level of the elevated threshold if/when the observed effect of activating this method decreases, to still address the desired part of the UE population.

In another embodiment, by introducing changes e.g. in the 3GPP standard, the UEs are relieved from reacquiring system information when the network wants the UEs to perform cell reselection measurements. The method can also target specific UE's to perform cell reselection measurements, e.g. UEs that are considered as stationary.

In other words, in one embodiment, the initializing of the cell re-selection procedure comprises initializing of an enforcement of a cell re-selection procedure of at least one user equipment within the serving cell. The enforcement comprises transmitting of a request for performing a cell re-selection procedure to the user equipment(s).

In one embodiment, the request for performing a cell re-selection procedure is an information element in a message.

In another embodiment, the request for performing a cell re-selection procedure is a message.

The embodiment introduces a new indication which requests the UEs to perform cell re-selection measurements, independent of current thresholds for cell re-selection measurements. The UE therefore has to be configured for interpreting such indications and to perform the requested tasks.

Figure 7:
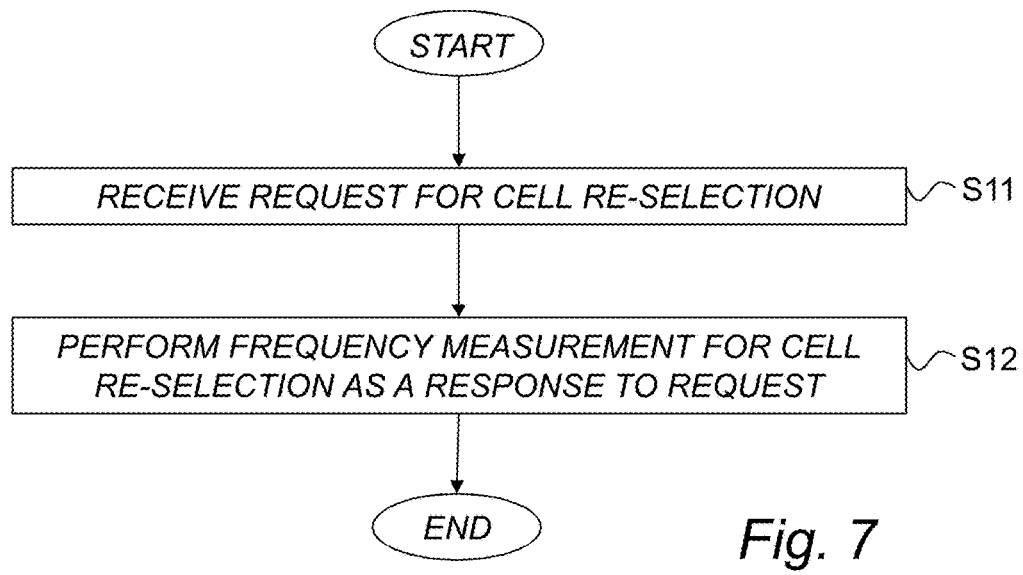
FIG. 7 illustrates a flow diagram of steps of an embodiment of a method for a cell re-selection procedure in a cellular communication system.

FIG. 7 illustrates a flow diagram of steps of an embodiment of a method for a cell re-selection procedure in a cellular communication system. In step S11, a request for performing a cell re-selection procedure is received in a user equipment. In step S12, a frequency measurement for cell re-selection is performed in a user equipment as a response to the received request. Any following steps of deciding on an actual re-selection or not and the way in which it is performed are preferably performed according to well-known prior art routines.

Figure 8:
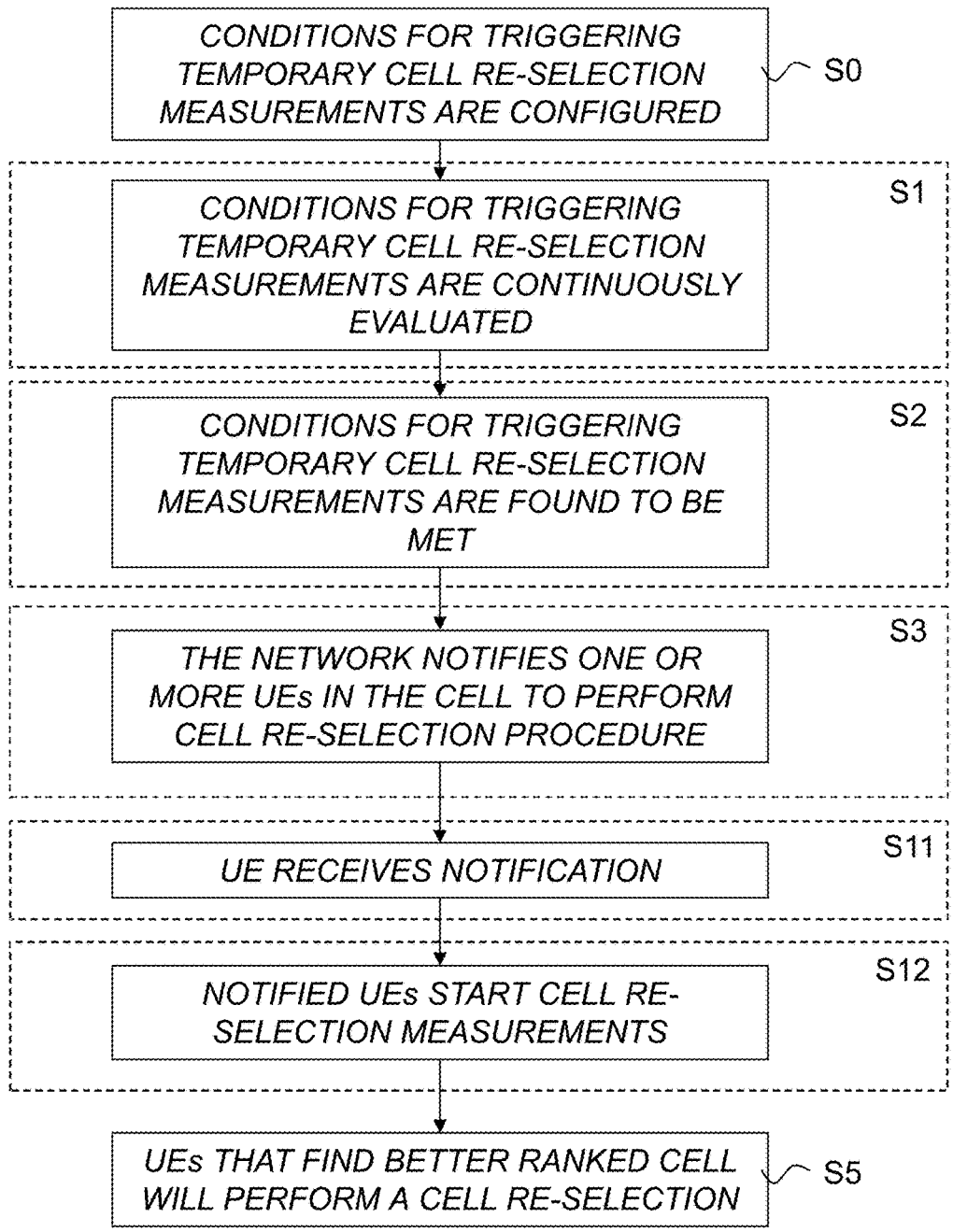
FIG. 8 illustrates different operations performed within a communication system in connection of a cell re-selection trigged by a notification to perform a cell re-selection.

FIG. 8 illustrates different operations within a communication system. This figure does not illustrate any method of any particular node, but is an illustration of the cooperation between different nodes within the system. In S0, conditions for triggering the temporary cell re-selection measurements is configured. This step may be performed in the same way as described further above. Analogously, the operations comprised in the steps S1 and S2 are preferably also performed in a similar manner as described further above.

As at least a part of Step S3, c.f. FIG. 4, the network notifies one or more UEs in the serving cell to perform or at least initiate a cell re-selection procedure. The initiation of the notification is in certain embodiments preferably performed in the MME. The notification is transferred to the UEs.

In one embodiment, the request for performing a cell re-selection procedure is broadcast to all user equipments in the serving cell.

In another embodiment, the request for performing a cell re-selection procedure is dedicated for a specific user equipment or a specific group of user equipments in the serving cell.

As at least a part of Step S11, c.f. FIG. 7, the UE receives the notification. This notification is thus to be considered as an override instruction to initiate a cell re-selection procedure despite of that a RX level still may be higher than the threshold for initiating a cell re-selection procedure.

As at least a part of Step S12, c.f. FIG. 7, notified UEs initiates the cell re-selection procedure by starting cell re-selection measurements.

In a particular embodiment, after completing the cell re-selection evaluation, the UEs shall not perform a new cell reselection measurement triggered by the indication from the network until a specified time has elapsed. This will prevent unnecessary measurements to be performed on UEs that recently have gone through a cell re-selection procedure. The specified time is in such embodiments preferably provided to UE as a written value in a specification or sent by the network to the UE. Alternatively, the specified time can be UE implementation dependent. The indication and the specified time can be sent to a specific UE or to all UEs in the serving cell. The indication and the specified time can be sent to the UEs carried by broadcasted- or dedicated signalling.

If cell re-selection measurements are performed, step S5 will follow, where UEs that find better ranked cells will perform a cell re-selection, c.f. FIG. 6 above.

Also in this embodiment, the criterion for an enforced cell re-selection procedure can be adapted continuously. In other words, in one embodiment, changes, if any, of the radio conditions and/or user equipment population of a cell are monitored within a time range starting when the step of initializing is performed. The criterion is then adapted in dependence of the monitored changes.

Similar conditions and trends discussed for the previous embodiment is typically valid also here, for the present embodiment.

Also in this embodiment, the information comprising radio conditions and/or user equipment population comprises information selected from a time since last initializing, an absolute level of user equipments in different radio coverage conditions in serving and/or neighbour cells, changes and trends in absolute level of user equipments in different radio coverage conditions in serving and/or neighbour cells, a ratio of user equipments in different radio coverage conditions in serving and/or neighbour cells, changes and trends in the ratio of user equipments in different radio coverage conditions in serving and/or neighbour cells, an uplink interference level in serving and/or neighbour cells, a timing advance of user equipments in serving and/or neighbour cells, and/or a load level in serving and/or neighbour cells.

The proposed technology may be applied to a user terminal, which may be a wired or wireless device.

As used herein, the non-limiting terms "User Equipment (UE)", "station (STA)" and "wireless communication device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the term "wired device" may refer to any device configured or prepared for wired connection to a network. In particular, the wired device may be at least some of the above devices, with or without radio communication capability, when configured for wired connection.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs, or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a network node configured to assist in a cell re-selection procedure in a cellular communication system. The network node is configured to obtain information comprising radio conditions and/or user equipment population related to at least a serving cell and optionally also related to at least one neighbour cell to the serving cell. The network node is configured to compare the obtained information with a criterion for enforced cell re-selection procedure. The network node is further configured to initialize an enforcement of, or an action for increasing the probability for causing, a cell re-selection procedure of at least one user equipment within the serving cell if the criterion for enforced cell re-selection procedure is fulfilled by the obtained information.

Figure 9:
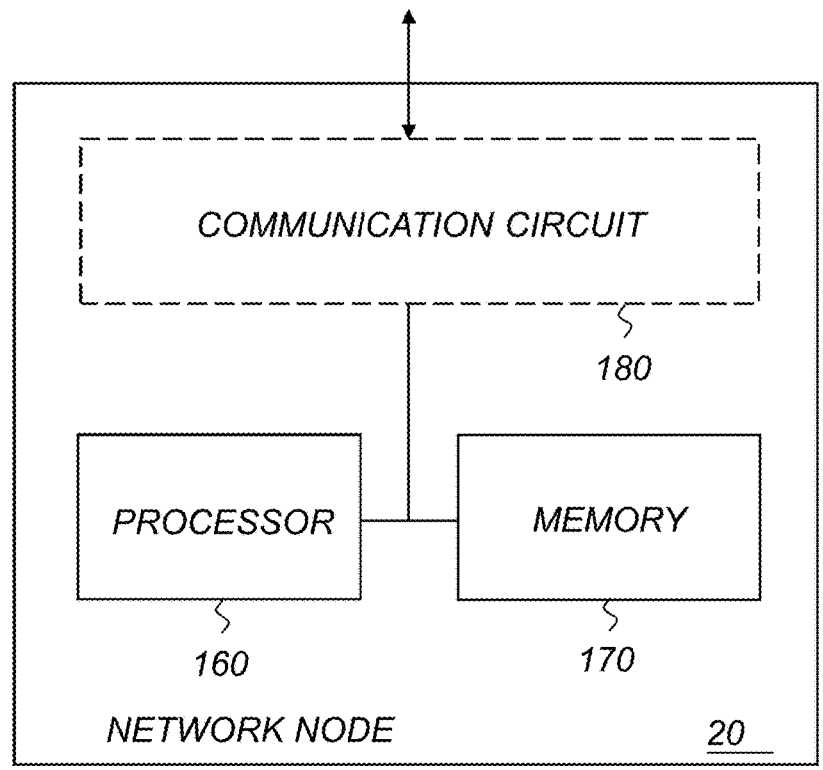
FIG. 9 is a schematic block diagram illustrating an embodiment of a network node.

FIG. 9 is a schematic block diagram illustrating an example of a network node 20, based on a processor-memory implementation according to an embodiment. In this particular example, the network node 20 comprises a processor 160 and a memory 170, the memory 170 comprising instructions executable by the processor 160, whereby the processor is operative to obtain the information comprising the radio conditions and/or the user equipment population related to at least a serving cell and optionally also related to a neighbour cell to the serving cell, to compare the obtained information with the criterion for enforced cell re-selection procedure, and to initialize the enforcement of, or an action for increasing the probability for causing, the cell re-selection procedure of the user equipment(s) within the serving cell.

Optionally, the network node 20 may also include a communication circuit 180. The communication circuit 180 may include functions for wired and/or wireless communication with other devices and/or network nodes in the network. In a particular example, the communication circuit 180 may be based on radio circuitry for communication with one or more other nodes, including transmitting and/or receiving information. The communication circuit 180 may be interconnected to the processor 160 and/or memory 170. By way of example, the communication circuit 180 may include any of the following: a receiver, a transmitter, a transceiver, input/output (I/O) circuitry, input port(s) and/or output port(s). The communication circuit 180 may be used for transmitting system information about changed thresholds or requests for performing a cell re-selection procedure.

In one embodiment, the network node is configured to perform the initializing by initializing an enforcement of a cell re-selection procedure of the user equipment(s) within the serving cell. The enforcement comprises transmitting of a request for performing a cell re-selection procedure to the user equipment(s).

In one embodiment, the request for performing a cell re-selection procedure is an information element in a message.

In another embodiment, the request for performing a cell re-selection procedure is a message.

In one embodiment, the request for performing a cell re-selection procedure is broadcast to all user equipments in the serving cell.

In one embodiment, the request for performing a cell re-selection procedure is dedicated for a specific user equipment or a specific group of user equipments in the serving cell.

In one embodiment, the network node is configured to perform the initializing by initializing an action for increasing the probability for causing a cell re-selection procedure of at least one user equipment within the serving cell. The action comprises increasing of a threshold for frequency measurements for cell re-selection for the user equipment(s) during a limited period of time.

In a further embodiment, the network node is further configured to determine a duration of the limited period of time and/or a level of the increased threshold in dependence on the information comprising the radio conditions and/or the user equipment population related to the cell.

In one embodiment, the increased threshold is applied to all user equipments in the serving cell.

In another embodiment, the increased threshold is applied to a specific user equipment or a specific group of user equipments in the serving cell.

In one embodiment, the network node is, or is comprised in, a mobility management entity. This is particularly advantageous if an enforcement of a cell re-selection procedure is used.

In one embodiment, the network node is further configured to monitor changes, if any, of the radio conditions and/or the user equipment population of a cell within a time range starting when the initializing is performed, and to adapt the criterion in dependence of the monitored changes.

In one embodiment, the information comprising radio conditions and/or user equipment population comprises information selected from a time since last initializing, an absolute level of user equipments in different radio coverage conditions in serving and/or neighbour cells, changes and trends in absolute level of user equipments in different radio coverage conditions in serving and/or neighbour cells, a ratio of user equipments in different radio coverage conditions in serving and/or neighbour cells, changes and trends in the ratio of user equipments in different radio coverage conditions in serving and/or neighbour cells, an uplink interference level in serving and/or neighbour cells, a timing advance of user equipments in serving and/or neighbour cells and/or a load level in serving and/or neighbour cells.

According to another aspect of the proposed technology there is provided a user equipment in a cellular communication system. The user equipment is configured to receive a request for performing a cell re-selection procedure. The user equipment is configured to perform a frequency measurement for cell re-selection as a response to the received request.

Figure 10:
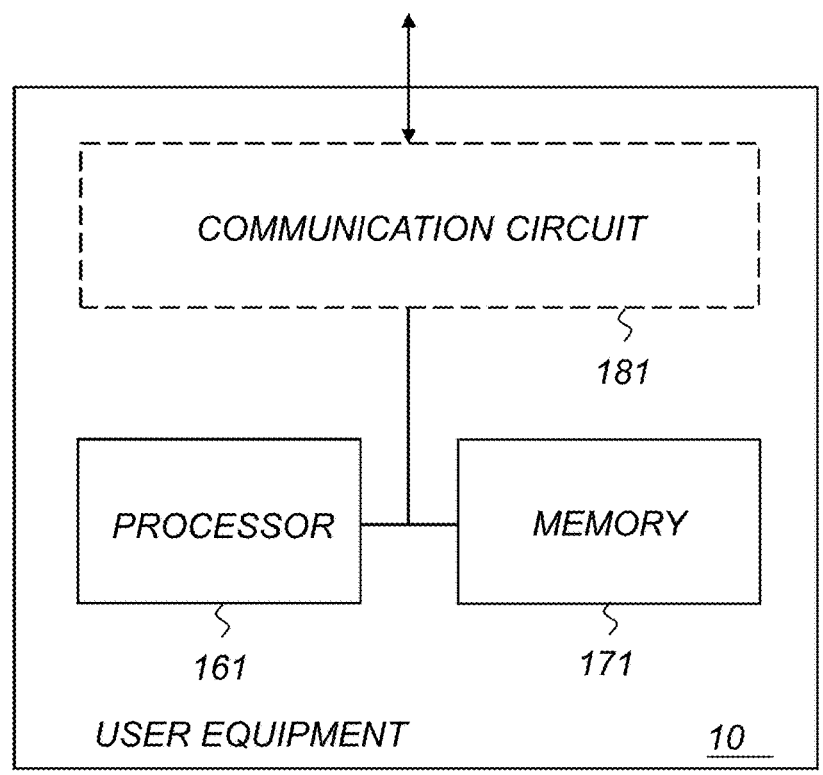
FIG. 10 is a schematic block diagram illustrating an embodiment of a user equipment.

FIG. 10 is a schematic block diagram illustrating an example of a user equipment 10, based on a processor-memory implementation according to an embodiment. In this particular example, the user equipment 10 comprises a processor 161 and a memory 171, the memory 171 comprising instructions executable by the processor 161, whereby the processor is operative perform a frequency measurement for cell re-selection as a response to the received request.

The user equipment 10 also includes a communication circuit 181. The communication circuit 181 may include functions for wired and/or wireless communication with other devices and/or network nodes in the network. In a particular example, the communication circuit 181 may be based on radio circuitry for communication with one or more other nodes, including transmitting and/or receiving information. The communication circuit 181 may be interconnected to the processor 161 and/or memory 171. By way of example, the communication circuit 181 may include any of the following: a receiver, a transmitter, a transceiver, input/output (I/O) circuitry, input port(s) and/or output port(s). The communication circuit 181 is used for receiving the request for performing a cell re-selection procedure.

Figure 11:
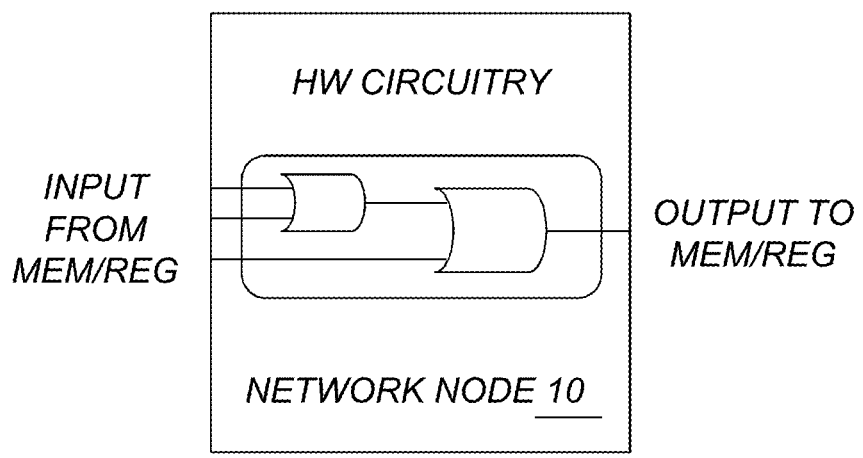
FIG. 11 is a schematic block diagram illustrating another embodiment of a network node.

FIG. 11 is a schematic block diagram illustrating another embodiment of a network node 20, based on a hardware circuitry implementation according to an embodiment. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 12:
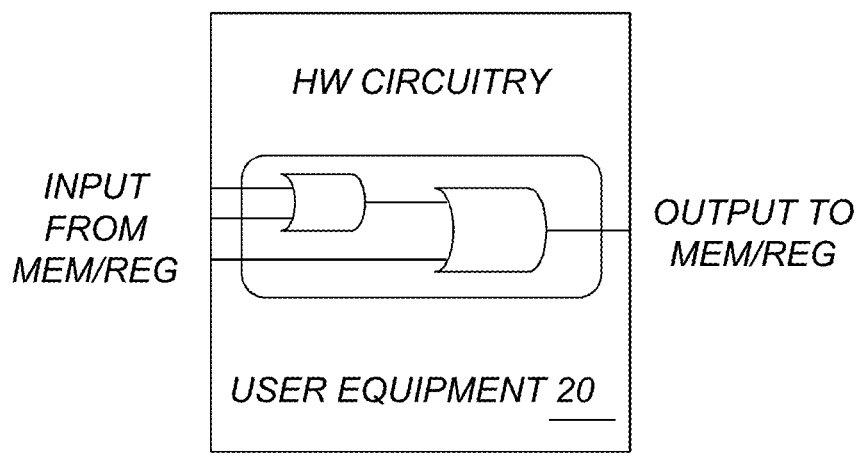
FIG. 12 is a schematic block diagram illustrating another embodiment of a user equipment.

FIG. 12 is a schematic block diagram illustrating another embodiment of a user equipment 10, based on a hardware circuitry implementation according to an embodiment. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 13:
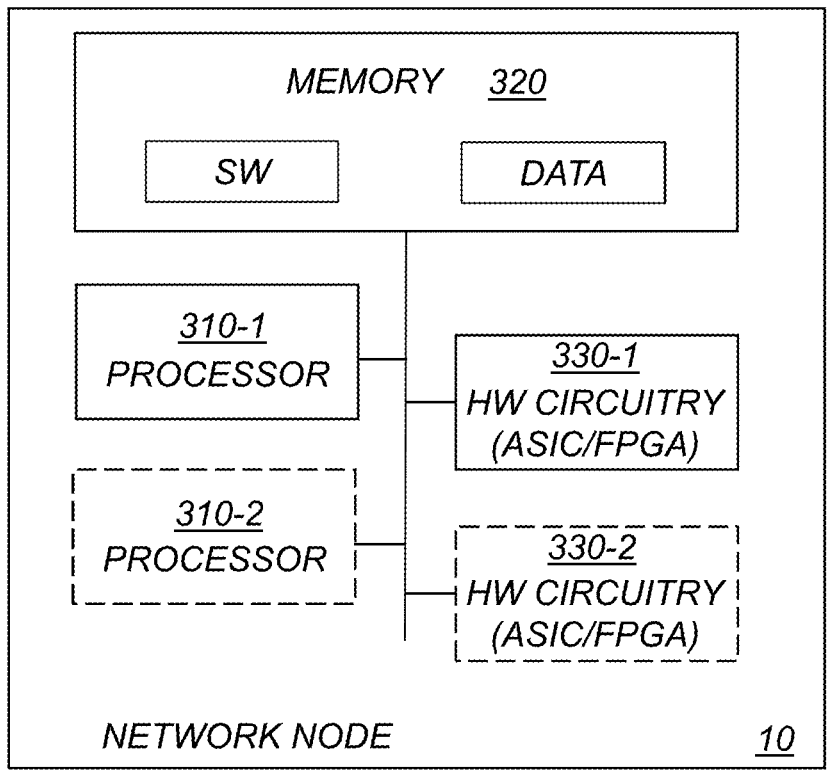
FIG. 13 is a schematic block diagram illustrating yet another embodiment of a network node.

FIG. 13 is a schematic block diagram illustrating yet another embodiment of a network node 20, based on combination of both processor(s) 310-1, 310-2 and hardware circuitry 330-1, 330-2 in connection with suitable memory unit(s) 320. The network node 20 comprises one or more processors 310-1, 310-2, memory 320 including storage for software and data, and one or more units of hardware circuitry 330-1, 330-2 such as ASICs and/or FPGAs. The overall functionality is thus partitioned between programmed software (SW) for execution on one or more processors 310-1, 310-2, and one or more pre-configured or possibly reconfigurable hardware circuits 330-1, 330-2 such as ASICs and/or FPGAs. The actual hardware-software partitioning can be decided by a system designer based on a number of factors including processing speed, cost of implementation and other requirements.

Figure 14:
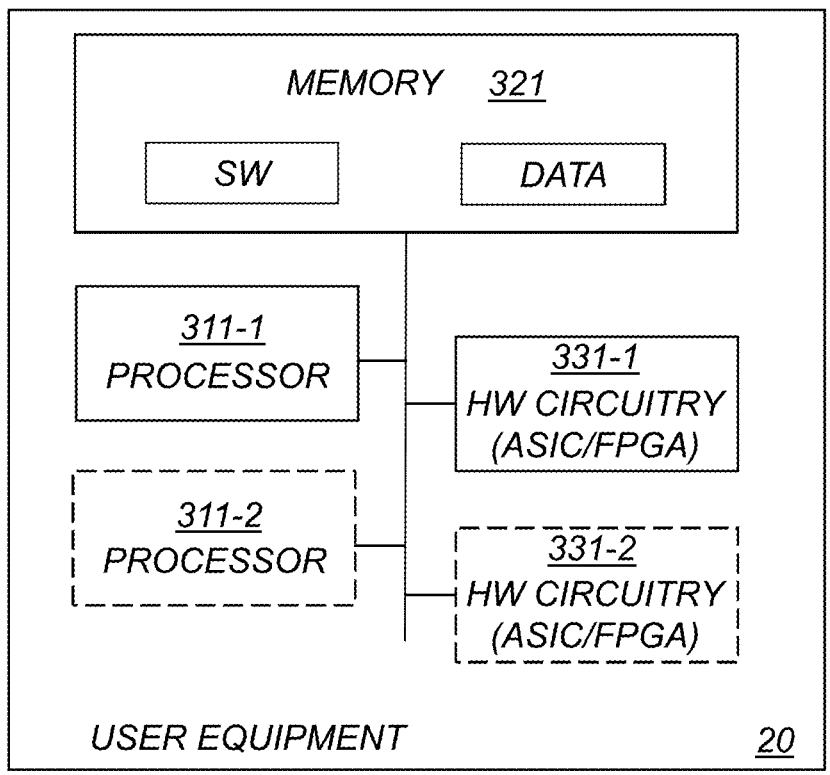
FIG. 14 is a schematic block diagram illustrating yet another embodiment of a user equipment.

FIG. 14 is a schematic block diagram illustrating yet another example of a user equipment 10, based on combination of both processor(s) 311-1, 311-2 and hardware circuitry 331-1, 331-2 in connection with suitable memory unit(s) 321. The user equipment 10 comprises one or more processors 311-1, 311-2, memory 321 including storage for software and data, and one or more units of hardware circuitry 331-1, 331-2 such as ASICs and/or FPGAs. The overall functionality is thus partitioned between programmed software (SW) for execution on one or more processors 311-1, 311-2, and one or more pre-configured or possibly reconfigurable hardware circuits 331-1, 331-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 15:
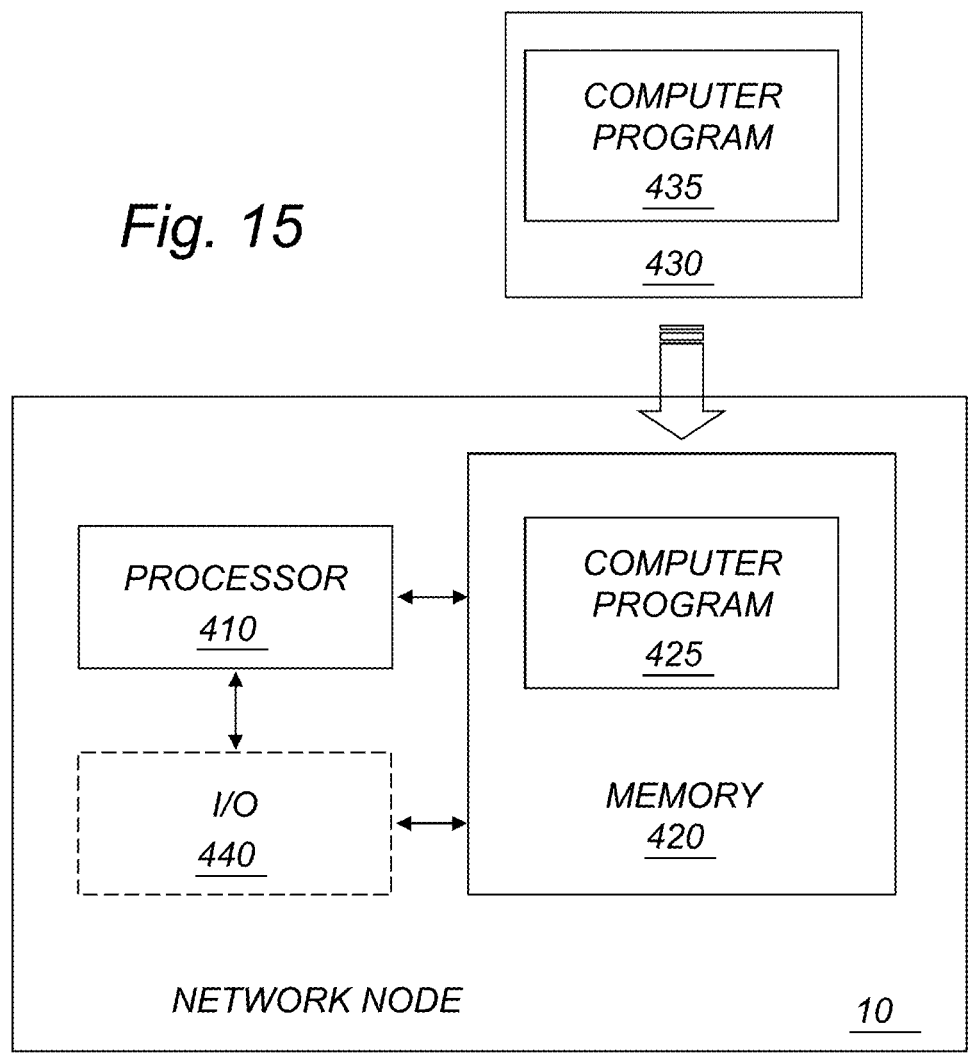
FIG. 15 is a schematic diagram illustrating an embodiment of a computer-implementation of a network node.

FIG. 15 is a schematic diagram illustrating an example of a computer-implementation of a network node 20 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

Figure 16:
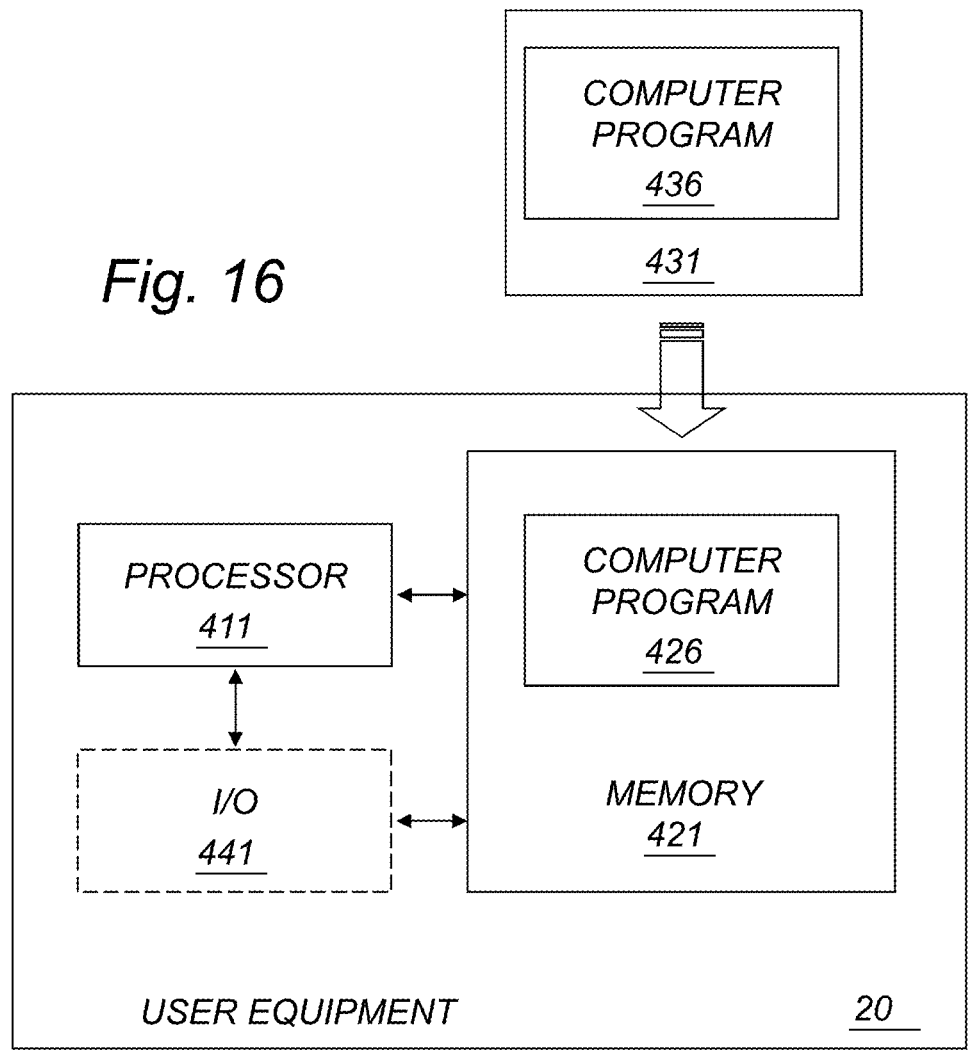
FIG. 16 is a schematic diagram illustrating an embodiment of a computer-implementation of a user equipment.

FIG. 16 is a schematic diagram illustrating an example of a computer-implementation of a user equipment 10 according to an embodiment. In this particular example, at least some of the steps, functions, procedures, modules and/or blocks described herein are implemented in a computer program 426; 436, which is loaded into the memory 421 for execution by processing circuitry including one or more processors 411. The processor(s) 411 and memory 421 are interconnected to each other to enable normal software execution. An optional input/output device 441 may also be interconnected to the processor(s) 411 and/or the memory 421 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410, 411 is thus configured to perform, when executing the computer program 425, 426, well-defined processing tasks such as those described herein.

The processing circuitry does not have to be dedicated to only execute the above-described steps, functions, procedure and/or blocks, but may also execute other tasks.

In a particular embodiment, the computer program comprises instructions, which when executed by at least one processor, cause the processor(s) to obtain information comprising radio conditions and/or user equipment population related to at least a serving cell and optionally also related to at least one neighbour cell to the serving cell. The instructions, when executed by the processor(s), further cause the processor(s) to compare the obtained information with a criterion for enforced cell re-selection procedure. The instructions, when executed by the processor(s), further cause the processor(s) to initialize an enforcement of, or an action for increasing the probability for causing, a cell re-selection procedure of at least one user equipment within the serving cell if the criterion for enforced cell re-selection procedure is fulfilled by the obtained information.

In another particular embodiment, the computer program comprises instructions, which when executed by at least one processor, cause the processor(s) to receive a request for performing a cell re-selection procedure. The instructions, when executed by the processor(s), further cause the processor(s) to perform a frequency measurement for cell re-selection as a response to the received request.

In one embodiment of an aspect of the here presented technology, a computer-program product comprises a computer-readable medium having stored thereon a computer program according to one of the two computer program embodiments presented here above.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425, 426; 435, 436 may be realized as a computer program product, which is normally carried or stored on a computer-readable medium 420, 421; 430, 431, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 17:
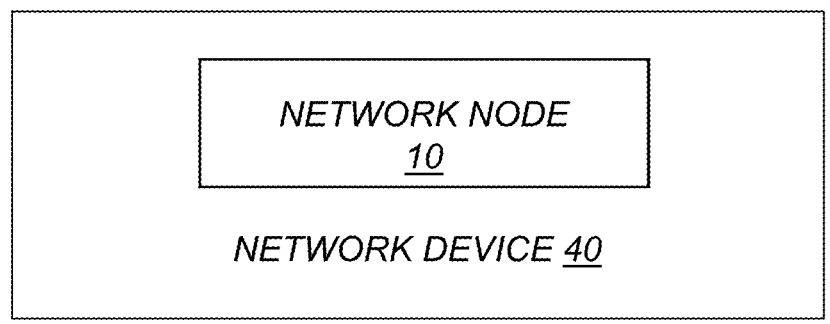
FIG. 17 is a schematic block diagram illustrating an embodiment of a network device comprising a network node.

FIG. 17 is a schematic block diagram illustrating an example of a network device 40 comprising a network node 20 according to any of the embodiments.

According to an aspect, there is provided a network device 40 comprising a network node 20 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 18:
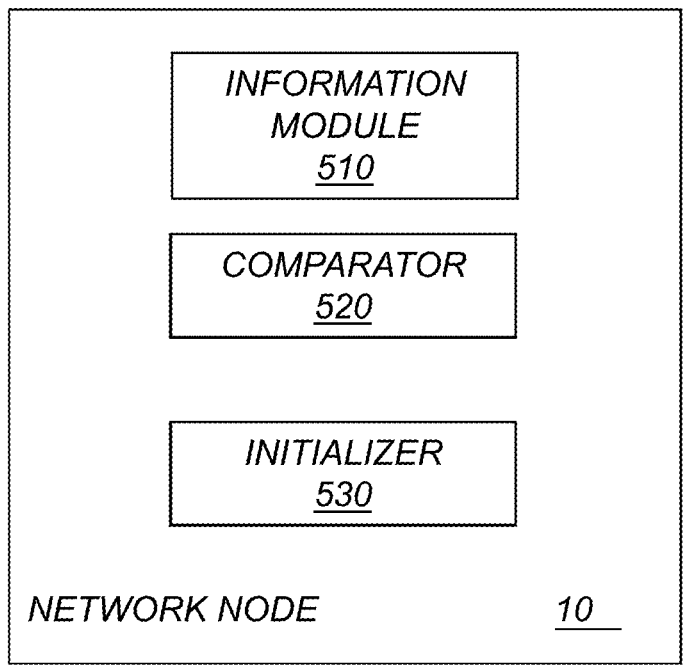
FIG. 18 is a schematic diagram illustrating an embodiment of a network node for assisting in a cell re-selection procedure in a cellular communication system.

FIG. 18 is a schematic diagram illustrating an embodiment of a network node 20 for assisting in a cell re-selection procedure in a cellular communication system. The network node 20 comprises an information module 510 for obtaining information comprising radio conditions and/or user equipment population related to at least a serving cell and optionally also related to at least one neighbour cell to the serving cell. The network node 20 further comprises a comparator 520 for comparing the obtained information with a criterion for enforced cell re-selection procedure. The network node 20 further comprises an initializer 530 for initializing an enforcement of, or an action for increasing the probability for causing, a cell re-selection procedure of at least one user equipment within the serving cell if the criterion for enforced cell re-selection procedure is fulfilled by the obtained information.

Figure 19:
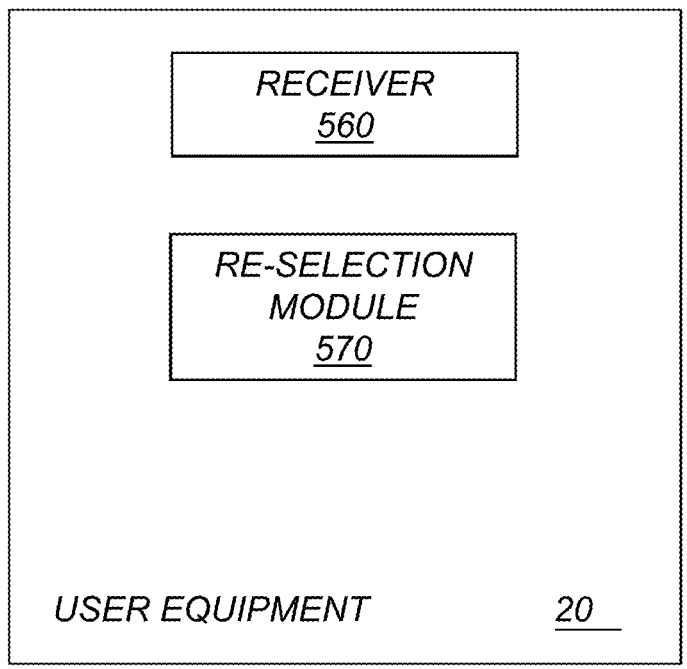
FIG. 19 is a schematic diagram illustrating an embodiment of a user equipment for use in a cellular communication system.

FIG. 19 is a schematic diagram illustrating an embodiment of a user equipment 10 for use in a cellular communication system. The user equipment comprises a receiver 560 for receiving a request for performing a cell re-selection procedure. The user equipment 10 further comprises a re-selection module 570 for performing a frequency measurement for cell re-selection as a response to the received request.

Alternatively it is possible to realize the module(s) in FIGS. 18-19 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centres, in other scenarios it may in fact be beneficial to distribute functionality over different parts of the network.

Figure 20:
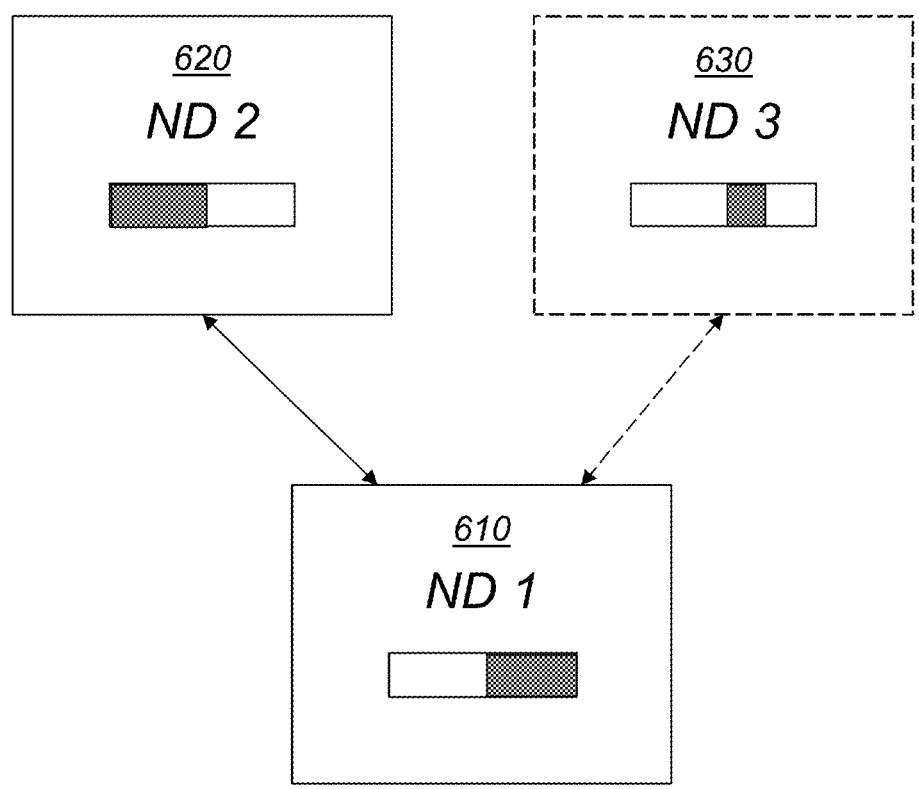
FIG. 20 is a schematic diagram illustrating an example of how functionality can be distributed or partitioned between different network devices.

FIG. 20 is a schematic diagram illustrating an example of how functionality can be distributed or partitioned between different network devices in a general case. In this example, there are at least two individual, but interconnected network devices, ND1 and ND2, with reference numerals 610 and 620, respectively, which may have different functionalities, or parts of the same functionality, partitioned between the network devices 610 and 620. There may be additional network devices, such as ND3, with reference numeral 630, being part of such a distributed implementation. The network devices 610-630 may be part of the same wireless communication system, or one or more of the network devices may be so-called cloud-based network devices located outside of the wireless communication system.

Figure 21:
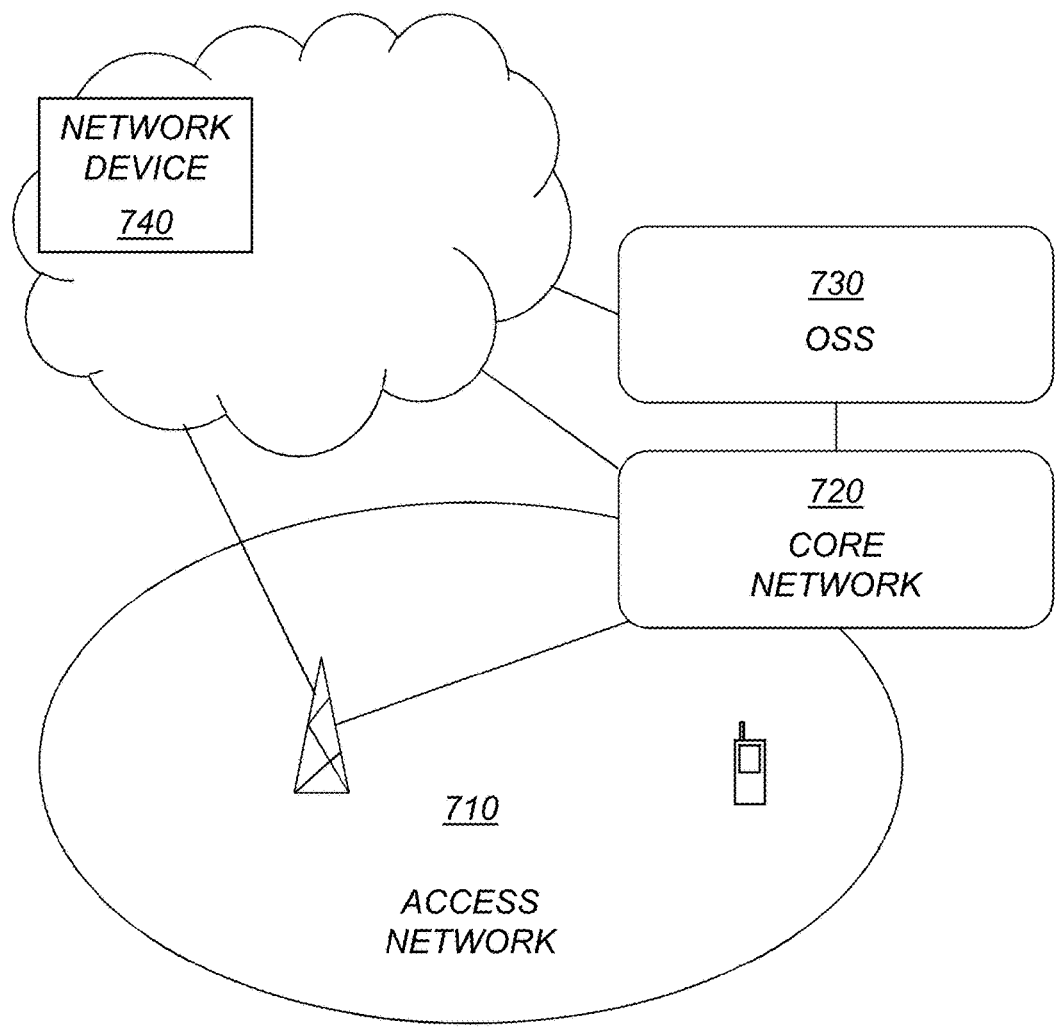
FIG. 21 is a schematic diagram illustrating an example of a wireless communication system.

FIG. 21 is a schematic diagram illustrating an example of a wireless communication system, including an access network 710 and/or a core network 720 and/or an Operations and Support System (OSS), 730 in cooperation with one or more cloud-based network devices 740. Functionality relevant for the access network 710 and/or the core network 720 and/or the OSS system 730 may be at least partially implemented for execution in a cloud-based network device 740, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Commercial Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centres, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

Figure 22:
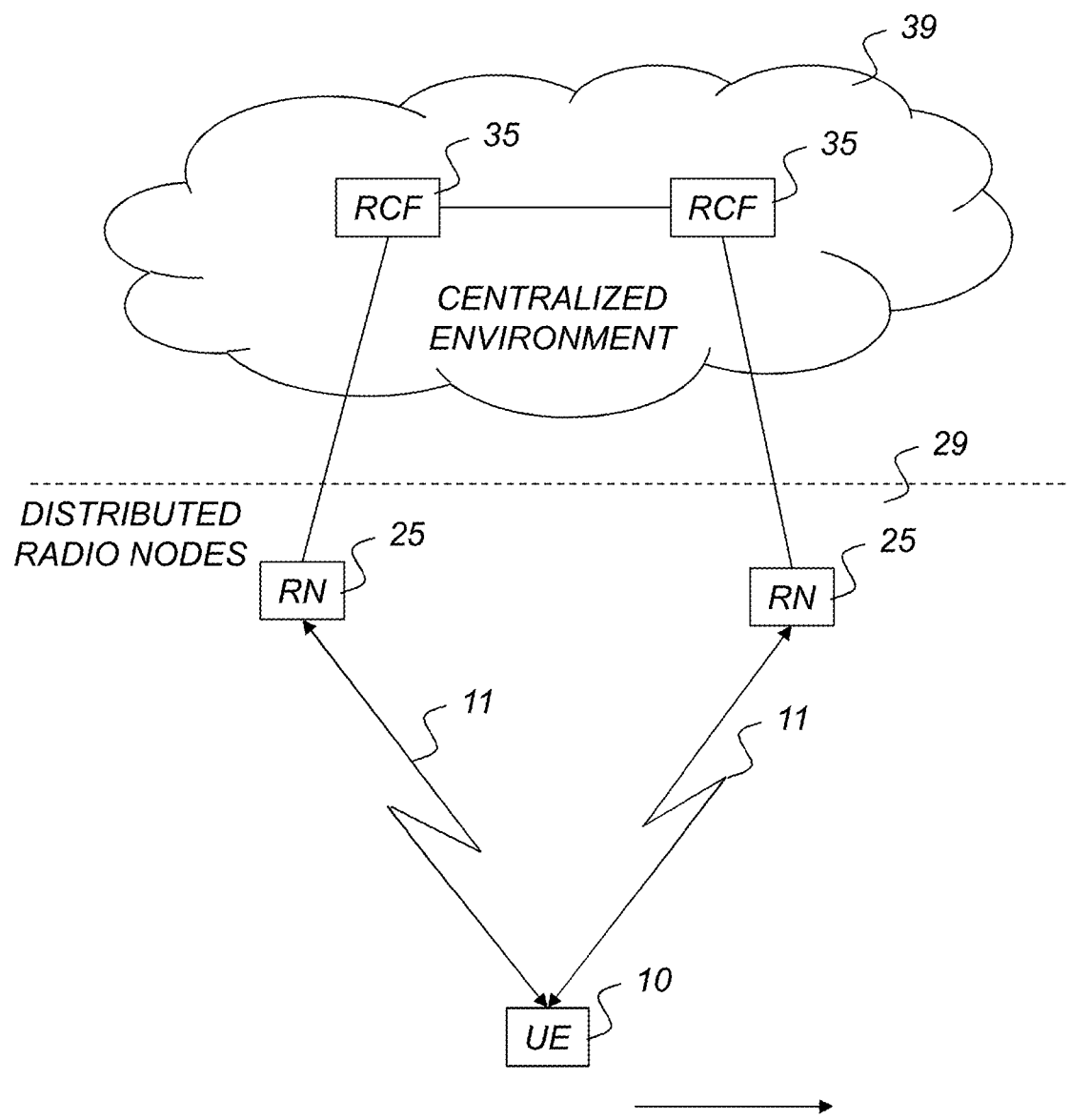
FIG. 22 illustrates radio control functions in a centralized computing environment.

FIG. 22 illustrates radio control functions in a centralized computing environment. The eNB function may be split into several nodes. One possible split is to move the radio control function 35, RCF, to a central location in a centralized environment 39 and keep the radio node 25, RN, part as distributed radio nodes 29 close to the antenna locations. The control of the cell re-selection threshold trigger can here be located in the RCF 35, but all transmission to and from the UE 10 is performed via the RN 25.

The technology presented here above has several advantages. UEs moved to better serving cells might connect with a lower CE level with fewer repetitions and potentially lower transmission power, thus generating less interference in and between cells. By utilizing this method and devices, the network can keep the thresholds for cell re-selection measurements very low most of the time and just occasionally trigger cell re-selection measurements either by a temporary increase of the thresholds or an explicit request.

The method and devices ensure that the network dynamically can react to changes in radio conditions and UE population in the cell and adjust the periodicity and level of the changes of the cell reselection thresholds accordingly.

The method and devices provide the possibility to keep the thresholds for cell reselection measurements very low most of the time and trigger e.g. a temporary increase of the thresholds after evaluating different parameters. In summary this will preserve energy in the UEs and a high NB-IoT capacity in the serving cell.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

3GPP 3rd Generation Partnership Project
ASIC Application Specific Integrated Circuits
BTS Base Transceiver Stations
CD Compact Disc
CE Coverage Enhancement
COTS Commercial Off-The-Shelf
CPE Customer Premises Equipment
CPU Central Processing Units
DSP Digital Signal Processors
DVD Digital Versatile Disc
eNB Evolved Node B
EPC Evolved Packet Core
EPS Evolved Packet System
E-UTRAN Evolved Universal Terrestrial Radio Access System
FPGA Field Programmable Gate Arrays
HDD Hard Disk Drive
HW hardware
I/O input/output
IoT Internet of things
LEE Laptop Embedded Equipment
LME Laptop Mounted Equipment
LTE Long Term Evolution
MEM memory units
MME Mobility Management Entity
NB Narrow Band
S-GW Serving Gateway
ND Network Device
NFV Network Function Virtualization
NI Network Interfaces
NIC Network Interface Controller
NR New Radio
OS Operating System
OSS Operations and Support System
PC Personal Computer
PDA Personal Digital Assistant
PLC Programmable Logic Controllers
RAM Random Access Memory
RCF Radio Control Function REG registers
RN Radio Node
ROM Read-Only Memory
RRU Remote Radio Units
SCTP Stream Control Transmission Protocol
STA Station
SW software
UE User Equipment
USB Universal Serial Bus
VM Virtual Machine
VMM Virtual Machine Monitor
VNE Virtual Network Element
WNIC Wireless Network Interface Controller

The invention claimed is:

1. A method for assisting in a cell re-selection procedure in a cellular communication system, wherein the method comprises:
obtaining information comprising at least one of radio conditions and user equipment population, related to at least a serving cell;
comparing the obtained information with a criterion for enforced cell re-selection procedure; and
initializing, if the criterion for enforced cell re-selection procedure is fulfilled by the obtained information, an enforcement of, or an action for increasing the probability for causing, a cell re-selection procedure of at least one user equipment within the serving cell;
wherein the initializing comprises initializing the action for increasing the probability for causing the cell re-selection procedure of the at least one user equipment within the serving cell, the action comprising increasing a threshold for frequency measurements for cell re-selection for the at least one user equipment during a limited period of time.

2. The method according to claim 1, further comprising determining at least one of:
a duration of the limited period of time; and
a level of the increased threshold,
in dependence on the information comprising at least one of radio conditions and user equipment population, related to the serving cell and/or at least one neighbor cell to the serving cell.

3. The method according to claim 1, wherein the increased threshold is applied to all user equipments in the serving cell.

4. The method according to claim 1, wherein the increased threshold is applied to a specific user equipment or a specific group of user equipments in the serving cell.

5. The method according to claim 1, further comprising:
monitoring changes, if any, of the at least one of radio conditions and user equipment population of a serving cell and/or at least one neighbor cell to the serving cell within a time range starting when the step of initializing is performed; and
adapting the criterion in dependence on the monitored changes.

6. The method according to claim 1, wherein the information comprising at least one of radio conditions and user equipment population comprises information selected from:
a time since the last initializing;
an absolute level of user equipments in different radio coverage conditions in the serving cell and/or at least one neighbor cell;
changes and trends in the absolute level of user equipments in different radio coverage conditions in the serving cell and/or at least one neighbor cell;
a ratio of user equipments in different radio coverage conditions in the serving cell and/or at least one neighbor cell;
changes and trends in the ratio of user equipments in different radio coverage conditions in the serving cell and/or at least one neighbor cell;
an uplink interference level in the serving cell and/or at least one neighbor cell;
a timing advance of user equipments in the serving cell and/or at least one neighbor cell; and
a load level in the serving cell and/or at least one neighbor cell.

7. A network node configured to assist in a cell re-selection procedure in a cellular communication system, wherein the network node comprises:
processing circuitry; and
a memory comprising instructions executable by the processing circuitry, whereby the processing circuitry is operative to:
obtain information comprising at least one of radio conditions and user equipment population related to at least a serving cell;
compare the obtained information with a criterion for enforced cell re-selection procedure; and
initialize, if the criterion for enforced cell re-selection procedure is fulfilled by the obtained information, an enforcement of, or an action for increasing the probability for causing, a cell re-selection procedure of at least one user equipment within the serving cell;
wherein the processing circuitry is configured to perform the initializing by initializing the action for increasing the probability for causing the cell re-selection procedure of the at least one user equipment within the serving cell, the action comprising increasing a threshold for frequency measurements for cell re-selection for the at least one user equipment during a limited period of time.

8. The network node according to claim 7, wherein the processing circuitry is configured to determine at least one of:
a duration of the limited period of time; and
a level of the increased threshold,
in dependence on the information comprising at least one of radio conditions and user equipment population, related to the serving cell and/or at least one neighbor cell to the serving cell.

9. The network node according to claim 7, wherein the increased threshold is applied to all user equipments in the serving cell.

10. The network node according to claim 7, wherein the increased threshold is applied to one of a specific user equipment and a specific group of user equipments in the serving cell.

11. The network node according to claim 7, wherein the network node is, or is in, a mobility management entity.

12. The network node according to claim 7, wherein the processing circuitry is configured to:
monitor changes, if any, of the at least one of radio conditions and user equipment population of the serving cell and/or at least one neighbor cell within a time range starting when the initializing is performed; and
adapt the criterion in dependence on the monitored changes.

13. The network node according to claim 7, wherein the information comprising at least one of radio conditions and user equipment population comprises information selected from:

a time since the last initializing;

an absolute level of user equipments in different radio coverage conditions in the serving cell and/or at least one neighbor cell;

changes and trends in the absolute level of user equipments in different radio coverage conditions in the serving cell and/or at least one neighbor cell;

a ratio of user equipments in different radio coverage conditions in the serving cell and/or at least one neighbor cell;

changes and trends in the ratio of user equipments in different radio coverage conditions in the serving cell and/or at least one neighbor cell;

an uplink interference level in the serving cell and/or at least one neighbor cell;

a timing advance of user equipments in the serving cell and/or at least one neighbor cell; and a load level in the serving cell and/or at least one neighbor cell.

14. A non-transitory computer readable medium storing a computer program for assisting in a cell re-selection procedure in a cellular communication system, the computer program comprising instructions, that when executed by at least one processor of a network node of the cellular communication system, cause the at least one processor to:

obtain information comprising at least one of radio conditions and user equipment population related to at least a serving cell;

compare the obtained information with a criterion for enforced cell re-selection procedure;

initialize, if the criterion for enforced cell re-selection procedure is fulfilled by the obtained information, an enforcement of, or an action for increasing the probability for causing, a cell re-selection procedure of at least one user equipment within the serving cell;

wherein the initializing comprises initializing the action for increasing the probability for causing the cell re-selection procedure of the at least one user equipment within the serving cell, the action comprising increasing a threshold for frequency measurements for cell re-selection for the at least one user equipment during a limited period of time.

* * * * *